(12) United States Patent
Goubin et al.

(10) Patent No.: US 8,582,774 B2
(45) Date of Patent: Nov. 12, 2013

(54) METHOD FOR MAKING SAFE AN ELECTRONIC CRYPTOGRAPHY ASSEMBLY WITH A SECRET KEY

(75) Inventors: Louis Goubin, Paris (FR); Mehdi-Laurent Akkar, Gentilly (FR)

(73) Assignee: Gemalto SA, Meudon (FR)

( * ) Notice: Subject to any disclaimer, the term of this patent is extended or adjusted under 35 U.S.C. 154(b) by 1925 days.

(21) Appl. No.: 10/506,851

(22) PCT Filed: Mar. 4, 2003

(86) PCT No.: PCT/IB03/00946
§ 371 (c)(1), (2), (4) Date: Feb. 23, 2010

(87) PCT Pub. No.: WO03/075506
PCT Pub. Date: Sep. 12, 2003

(65) Prior Publication Data
US 2010/0272264 A1    Oct. 28, 2010

(30) Foreign Application Priority Data
Mar. 7, 2002 (FR) ..................... 02 02918

(51) Int. Cl.
*H04L 9/00* (2006.01)
(52) U.S. Cl.
USPC .......................... 380/277; 713/189
(58) Field of Classification Search
USPC .............. 726/34; 713/189; 380/277
See application file for complete search history.

(56) References Cited

U.S. PATENT DOCUMENTS

| | | | |
|---|---|---|---|
| 4,932,053 A | | 6/1990 | Fruhauf |
| 5,493,240 A | | 2/1996 | Frank |
| 5,708,715 A | * | 1/1998 | Vicard .................. 713/191 |
| 5,764,761 A | * | 6/1998 | Vicard .................. 713/189 |
| 5,944,833 A | | 8/1999 | Ugon |
| 6,295,606 B1 | * | 9/2001 | Messerges et al. ....... 713/189 |
| 6,298,442 B1 | | 10/2001 | Kocher et al. |
| 6,804,782 B1 | * | 10/2004 | Qiu et al. ................ 713/194 |
| 6,873,706 B1 | * | 3/2005 | Miyazaki et al. ......... 380/30 |
| 6,940,975 B1 | * | 9/2005 | Kawamura et al. ....... 380/37 |

(Continued)

FOREIGN PATENT DOCUMENTS

| | | |
|---|---|---|
| EP | 0981223 A2 | 2/2000 |
| EP | 1109350 A1 | 6/2001 |
| WO | WO0041356 A1 | 7/2000 |
| WO | WO0042511 A | 7/2000 |

OTHER PUBLICATIONS

PCT/IB03/00946 International Search Report, Jun. 12, 2003 European Patent Office, P.B. 5818 Patentlaan 2 NL—2280 HV Rijswijk.

(Continued)

*Primary Examiner* — Fikremariam A Yalew
(74) *Attorney, Agent, or Firm* — The Jansson Firm; Pehr B. Jansson

(57) ABSTRACT

An aim of this invention is to eliminate the risks of aggression "DPA of the n order" attacks, for all n values, of cryptography electronic assemblies or systems with a secret or private key. The process according to this invention concerns a securing process for an electronic system using a cryptographic calculation procedure using a secret key. The process consists of masking intermediate results in input or output of at least one critical function for the said procedure.

15 Claims, 2 Drawing Sheets

(56) References Cited

U.S. PATENT DOCUMENTS

| | | |
|---|---|---|
| 7,092,523 B2* | 8/2006 | Pezeshki et al. .............. 380/28 |
| 7,386,130 B2* | 6/2008 | Ito et al. .............. 380/263 |
| 2001/0048742 A1* | 12/2001 | Handschuh .............. 380/30 |
| 2002/0029346 A1* | 3/2002 | Pezeshki et al. .............. 713/190 |
| 2003/0044003 A1* | 3/2003 | Chari et al. .............. 380/28 |
| 2003/0048903 A1* | 3/2003 | Ito et al. .............. 380/263 |
| 2003/0053576 A1 | 3/2003 | Cao |
| 2004/0071288 A1* | 4/2004 | Romain et al. .............. 380/37 |
| 2006/0090081 A1* | 4/2006 | Baentsch et al. .............. 713/189 |
| 2007/0053509 A1* | 3/2007 | Pezeshki et al. .............. 380/28 |

OTHER PUBLICATIONS

PCT/FR01/04124 International Search Report, Mar. 27, 2002, European Patent Office, P.B. 5818Patentlaan 2 NL—2280 HV Rijswijk.

\* cited by examiner

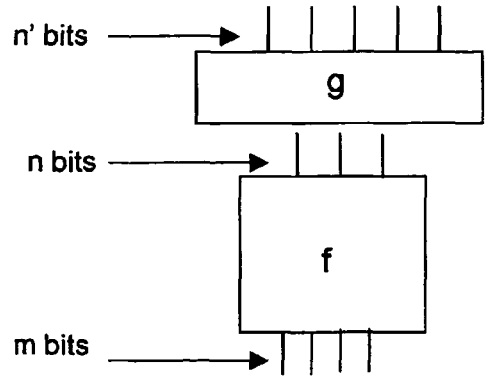
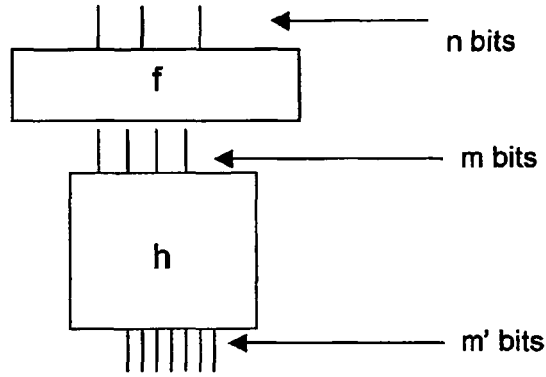
FIG.1a  FIG.1b
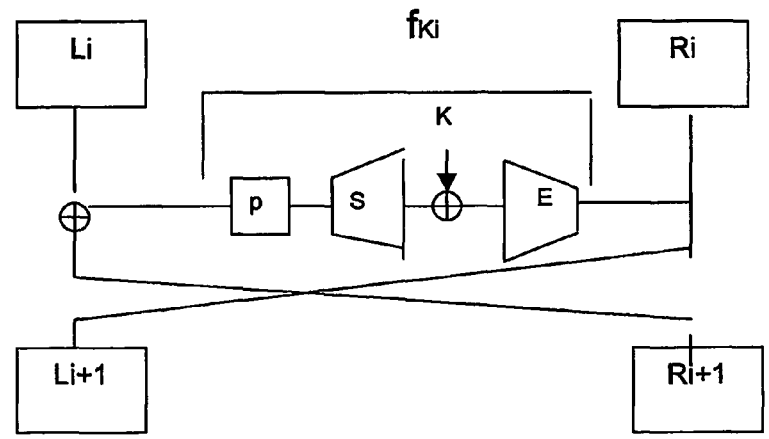
FIG.2

METHOD FOR MAKING SAFE AN ELECTRONIC CRYPTOGRAPHY ASSEMBLY WITH A SECRET KEY

BACKGROUND OF THE INVENTION

1. Field of the Invention

This invention relates to a method for making safe an electronic assembly involving a cryptographic algorithm using a secret key. More precisely, the method aims at achieving a version of the algorithm that is not damageable by some types of physical attacks—called High-Order Differential Power Analysis—trying to obtain information on the secret key after studying the electric consumption of the electronic assembly during the running of computation.

2. Description of the Related Art

The cryptographic algorithms considered here use a secret key to calculate an output information according to an input information; this may be a coding, decoding, signature, check of the signature, authentification or non-repudiation operation. They are made so that an aggressor, knowing the inputs and outputs, may not practically deduct any information concerning the secret key itself.

Thus it is a question of a larger category than the one classically designated by the expression algorithms with a secret key or symmetrical algorithms. In particular, anything described in this patent application also applies to algorithms said to be with a public key or unsymmetrical algorithms, which actually have two keys: one is public, the other private, not disclosed, the last one being that aimed at by the aggressions described hereunder.

The aggressions of the type Power Analysis start from the fact that really the aggressor may acquire information other than the simple release of inputs and outputs, when calculation is carried out, as for instance the electrical consumption of the micro controller or the electromagnetic radiation produced by the circuit.

The differential electrical consumption analysis is the principle of a category of attacks called Differential Power Analysis, DPA in short, enabling to obtain information on the secret key contained in the electronic assembly, by making a statistical analysis of electrical consumption recordings made over many calculations with the same key.

In the simplest attack, called "DPA of the first order" or simply "DPA" when there is no confusion possible, the attacker records current consumption signals and calculates the individual statistical properties for the signal at each moment. Here we consider the attacks called High-Order Differential Power Analysis, HO-DPA in short, generalising the "DPA of the first order" attack: the aggressor now calculates the joint statistical properties of the electrical consumption taken at several different times. More precisely, a n-order DPA attack take into account n values of the consumption signal, corresponding to n different intermediate values, that appear during the calculation of the cryptographic algorithm. The intermediate values detected by attacks will be named in the following text, critical information.

Is considered, as a non-limiting example, the case of the DES algorithm (Data Encryption Standard), which is described in FIPS PUB 46-2, *Data Encryption Standard*, 1994, a document mentioned as a reference.

The DES algorithm runs in 16 steps called rounds (see FIG. 2). In each of the 16 rounds, a conversion f is made with 32 bits. This conversion f uses eight non linear conversions of 6 bits over 4 bits, coded each in a table called S-box (S on FIG. 2)

A DPA attack of the second order on the DES may be executed as follows:

In a first step, consumption measurements are made over the first round, for 1000 DES calculations. $E[1], \ldots, E[1000]$ should be noted as input values for these 1000 calculations. $C[1], \ldots, C[1000]$ should be noted as the 1000 corresponding curves of electrical consumption measured when making these calculations.

In a second step, let us suppose that two bits (being critical information), with a respective value $b_1$ and $b_2$, appear during the calculations and are such that $b_1 \oplus b_2$ equal the value b of the first output bit from the first S-box over the first round. Here, $\oplus$ designates the function "OR-exclusive" bit by bit. An assumption is made on the $\delta$ time interval between the time where there is the consumption curve point corresponding to $b_1$ and that corresponding to $b_2$. Then is associated with each curve $C[i]$ where i is an integer successively equal to 1, 2, . . . , 1000, an other curve $C_\delta[i]$ equal to the difference between $C[i]$ and the curve obtained from $C[i]$ by translation of a $\delta$ value along the X-axis. The average CM curve of the 1000 $C_\delta[i]$ curves is also calculated.

In a third step, it is easy to see that b only depends on 6 bits of the secret key. The aggressor makes a supposition concerning the 6 bits. He calculates—from those 6 bits and the $E[i]$—the theoretical values expected for b. This allows a separation of the 1000 inputs $E[1], \ldots, E[1000]$ into two classes: those leading to b=0 and those leading to b=1.

In a fourth step, a calculation is then made of the CM' average (respectively CM") of the $C_\delta[i]$ curves relating to inputs of the first class (respectively the second class), i.e. for which b=0 (respectively b=1). If CM' and CM" show a large difference, it is considered that the values taken for the 6 bits in the key, as well as the choice of the $\delta$ value were the correct ones. If CM' and CM" show no great difference, in the statistical meaning, i.e. no difference clearly higher than the typical offset for the measured noise, the second step is restarted with another choice for the 6 bits. If no choice for the key 6 bits is valid, steps 3 and 4 are restarted with another choice for $\delta$.

In a fifth step, the steps 2, 3 and 4 are repeated with two bits from where the "or-exclusive" is out of the second S-box, then the third S-box, . . . , up to the eighth S-box. Finally 48 bits of the secret key are thus obtained.

In a sixth step, the 8 remaining bits may be found using a thorough search.

Theoretically, the DPA of the n order does not require any knowledge of the individual electrical consumption for each instruction, nor of the position in time for each instruction. It similarly applies when it is estimated that the attacker knows some algorithm outputs and the corresponding consumption curves. It is only based on the basic supposition that:

There is a set of n intermediate variables, that appears during the algorithm calculation, such as the knowledge of a few key bits, practically less than 32 bits, allowing to decide if two inputs, and respectively two outputs, lead or not to the same value for a known function of these n variables.

All the algorithms using S-boxes, such as the DES, are potentially vulnerable by the "High Order DPA", as the usual embodiment modes, including those designed to resist "DPA of the first order" attacks, remain generally under the above mentioned hypothesis.

Practically, the installation requires also finding (through a thorough search or the knowledge of other information, for instance the detail of the cryptographic algorithm implementation) the time intervals between the consumption curve points which correspond to the n variables considered.

An aim of this invention is to eliminate any risk of "DPA of the n order" attacks, for all values of n, of sets or cryptography electronic systems with a secret or private key.

Another aim of this invention is to give protection for the cryptography electronic systems such as the basic hypothesis above mentioned is not verified anymore, i.e. no known function of a set of n intermediate variables depends on the knowledge of an easily accessible subset of the secret or private key, with the "High Order DPA" attacks being thus inoperative.

SUMMARY OF THE INVENTION

This invention concerns a securing process for an electronic system including a processor and a memory, implementing a cryptographic calculation procedure stored in the memory using a secret key characterized in that it consists of masking input or output intermediate results of at least one critical function of the said procedure carried out with the processor so that the critical function respectively gives in output or receives in input non-masked intermediate results.

BRIEF DESCRIPTION OF DRAWINGS

Other aims, advantages and characteristics of this invention will be shown when reading the following description of the process implementation according to this invention and a embodiment mode for an electronic system adapted to this implementation given as non limiting example referring to the drawings here attached in which:

FIGS. 1a and 1b show a diagram of two types of replacement function of the process according to this invention;

FIG. 2 shows a diagram of a round for the classical DES algorithm;

DESCRIPTION OF THE INVENTION

Figure 3A:
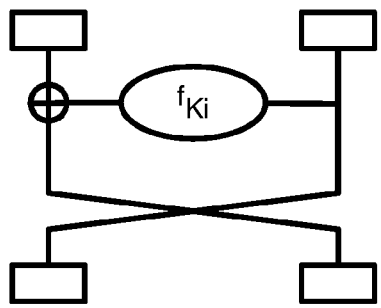
FIGS. 3a to 3e show a diagram of each type of possible round for the DES algorithm to which the process according to the invention is applied.
Figure 3B:
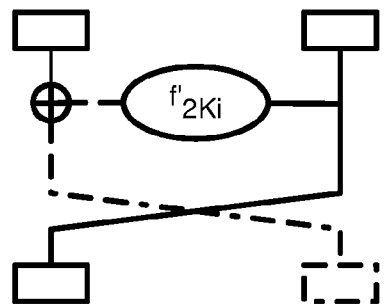
Figure 3C:
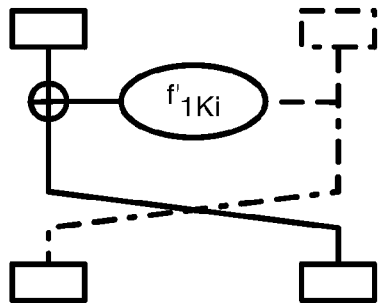
Figure 3D:
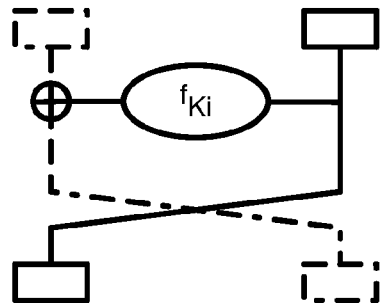
Figure 3E:
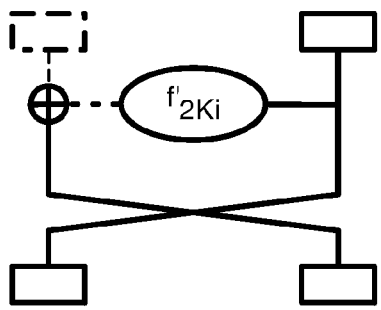

The process according to the invention aims at securing an electronic system, and for instance a system on-board such as a chip card using a cryptographic calculation procedure with a secret key. The electronic system includes a processor and a memory. The cryptographic calculation procedure is incorporated in the memory, for instance of the ROM type for the said system. The processor for the said system carries out the calculation procedure using a secret key, stored in a secret area of a memory, for instance of the E2PROM type.

The process according to the invention consists of masking intermediate results making up critical information obtained in the calculation procedure as input or output of a function, hereafter called critical function.

This process replaces a critical function with a replacement function doing the "same" calculation but with modified input or output data.

As shown on FIGS. 1a and 1b, any f function with n bits to m bits making a calculation (calculation through a series of basic operations, consulting a table . . . ) is replaced by a new function p consisting of f with another function g (from n' bits to n bits) (FIG. 1a) or h (from m bits to m' bits) (FIG. 1b), with g being carried out before f and h being carried out after f; thus this process replaces in the calculation f with (g→f) or with (f→h).

According to an illustrating example, g and h are data masking operations of the "or-exclusive" form. The p function seizes in input g-masked data or exits h-masked data.

The word 'mask' in this description means to convert using a non public function (internal, unknown by the card user) for instance a function using a hazard.

Masking a first critical function in a calculation procedure occurs in output with an h function; masking a last critical function in a calculation procedure occurs in input with g function. In this way, the calculation procedure receives in input and gives in output non-masked data: masking is clear for the outside. A person wishing to make an aggression of the DPA type to the system does not know that the intermediate results making detectable information are masked and it will not be possible for him to draw any conclusion from its results without understanding the reason.

It should be noted that the size of input data of g (and output data of h) is not necessarily the same size as that of f.

This invention has two aspects: converting the calculation procedure itself (how to include a modified function) as well as the calculation mode of the modified function (for instance the method to build the new table if it is basically an access to a table)

The following description describes an application of this invention to algorithm DES. First, a first example simplified but easy to understand is shown to enable next to study various developments directly issued from this first example.

The process according to this invention solves separately two problems:

how is arranged the DES using the modified S-boxes, and how these S-boxes are constructed.

The arrangement of the DES using modified S-boxes in a first simplified example is described below with reference to FIGS. 2, 3a to 3e and 4.

First is considered the $i^{th}$ round of DES (FIG. 2). The S-boxes of the classical DES are modified in order to manipulate masked data. Then is considered $\alpha$ with any value of 32 bits. Two new functions are defined, $S'_1$ and $S'_2$ of 48 bits to 32 bits as:

$$S'_1(x) = S(x \text{ xor } E(\alpha)) \text{ for any } x \text{ over 32 bits}$$

$$S'_2(x) = S(x) \text{ xor } P^{-1}(\alpha) \text{ for any } x \text{ over 32 bits}$$

Then are defined two functions $f'_{1,Ki}$ and $f'_{2,Ki}$ analogous to function $f_{Ki}$ but using $S'_1$ and $S'_2$ box instead of S.

The two new functions allow $f'_{1,Ki}$ to obtain a masked value by $\alpha$ starting from a non-masked value and inversely for $f'_{2,Ki}$.

FIGS. 3a to 3e show the whole of the diagrams per round of DES (A to E) obtained by using values masked or not by $\alpha$ and the various boxes ($S_{Ki}$, $S'_{1,Ki}$ or $S'_{2,Ki}$). To make it clear, the masked data is shown in dotted lines whereas the non-masked data (normal) is shown in full lines.

Figure 4:
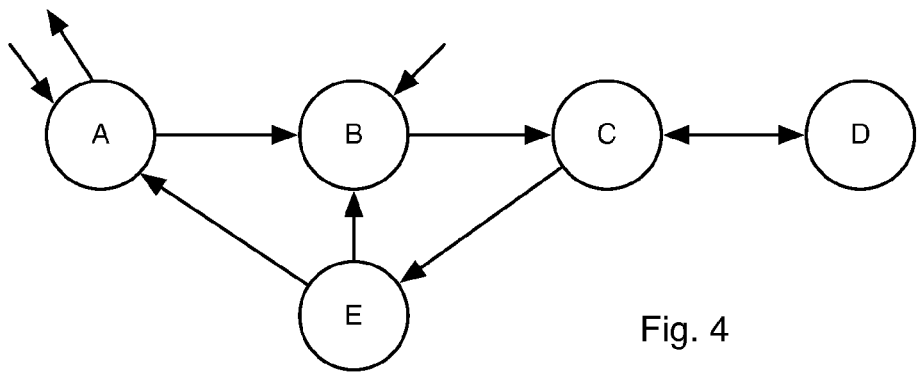
FIG. 4 is a symbolic show as an automaton of the DES algorithm for which the process according to the invention is applied.

FIG. 4 shows the whole of round sequences likely to be obtained, symbolized as an automaton. As said previously, in order to leave and arrive with non-masked data, the starting status is A or B, whereas the end ones are A or E.

Thus it is possible to carry out a complete DES (16 rounds) with the sequence: IP-BCDCDCEBCDCDCDCE-IP$^{-1}$. Starting with a message M, the process enables to obtain a usual cipher (the one that would have been obtained with the sequence IP-AAAAAAAAAAAAAAAA-IP$^{-1}$), that is without unmasking in and out.

There are many valid combinations; some even enable the sole first and last rounds to be masked using normal rounds (type A) between these masked rounds; such as, for instance: IP-BCEAAAAAAAAAABCE-IP$^{-1}$.

According to a development of this invention, the data are masked with different masks depending on the rounds. Taking the round notations used above (A, B, C, D and E), an index is added ($\alpha, \beta, \gamma \ldots$) that symbolises the 32 bits mask used in masking. It is thus seen that the B round in the simplified example above is written $B_\alpha$. It should be also noted that the A round does not need to be indexed with a mask value as the mask is not involved. In such generalisation example, a DES is made according to the following sequence:

$$IP-B_\alpha C_\alpha D_\alpha C_\alpha D_\alpha C_\alpha E_\alpha B_\beta C_\beta D_\beta C_\beta D_\beta C_\beta D_\beta C_\beta E_\beta - IP^{-1}$$

In this way, the rounds, and in particular the first and last sensitive to attacks, are protected by separate masks.

In order to carry out the above mentioned calculations, it is necessary to build S-boxes of the type S, $S'_{1,\alpha}, S'_{2,\alpha}, S'_{1,\beta}$ and $S'_{2,\beta}$.

The various modified S-Boxes used in this process according to this invention are built in a secure manner based on the following formulae:

$$S'_{1,\alpha}(x)=S(x \text{ xor } E(\alpha))$$

$$S'_{1,\beta}(x)=S(x \text{ xor } E(\beta))$$

$$S'_{2,\alpha}(x)=S(x) \text{xor } P^{-1}(\alpha)$$

$$S'_{2,\beta}(x)=S(x) \text{xor } P^{-1}(\beta)$$

The said formulae are split according to the basic operations given hereafter:

Extract a random value (such as $\alpha, \beta \ldots$);

Permutation of the bits of a secret value (such as $E(\alpha)$, $P^{-1}(\beta) \ldots$);

Carry out the XOR of a value (such as $P^{-1}(\alpha)$ for instance) with a value table that corresponds to the usual values of the S-Box (in or out).

The draw of a random value of n bits (for DES, n=32) is made on the basis of the following algorithm.

The system in which the process is used comprises a table 't' of n octets and a hazard source over an octet called 'rand'. The algorithm is run as follows:

For i from 0 to n−1: t[i]:=rand % 2

For i from 0 to m−1: permute t[rand % n] and t [rand % n]

Where m is a number that is basically higher than or equal to n.

'%' is the modulo operation or the rest of the whole division.

The result wanted is the chain of the n bits contained in table t.

According to a first version, this system comprises a table t of n/4 octets.

For i between 0 and n/4−1: t[i]:=rand

For i between 0 and m: Permute t[rand % (n/4)] against t[rand % (n/4)]

Where m is a number basically higher than n/4.

The result is the concatenation of the first four bits for each of the n/4 octets of t.

According to a second version, the algorithm is taken again according to the first version using n/2, n/3, n/8 or any divider for n.

According to a third version, instead of exchanging cases in a random manner, a case is chosen randomly and is added with the XOR operation to a random value.

The permutation of n bits from a secret value to m bits (in the case of DES: in the permutation $P^{-3}(\beta)$: n=48 and m=32, in the permutation $E(\alpha)$: n=m=32) is based on the following algorithm.

In the example described, it is wished to permute a table marked 'in' of n bits to a table marked 'm' of m bits; the system includes a 'temp' table of m values (each case may contain the value n−1).

One builds in the temp table a permutation of the numbers 0, 1, 2, ..., m−2, m−1

For i from 0 to m−1: out[V[temp[i]]]:=in [temp[i]]

Actually, it is a question of making a permutation in a random manner bit by bit.

According to a first version, the permutation is made, not bit by bit but k bits by k bits, everything in a random manner.

According to a second version, it is also possible to add dummy values in table V, and/or in the input and/or output table. Thus, if octets are used to store a bit, it is possible to complete the other 'vacant' bits with hazards.

The embodiment of the XOR operation consists of adding a value (such as $P^{-1}(\alpha)$) of n bits in at table of m values.

The operation may be carried out in a random manner on the octets of the output table as well as on the bits of these octets.

According to a version, it is also possible to add dummy values in the bits of $\alpha$ as well as in table t.

The process according to this invention uses a non public function for masking when the S-boxes are built without the key being used. When the calculation procedure is running, no mask is used. Thus, the process according to this invention enables to secure the electronic system against any attack using the mask even without knowing it.

It should be underlined that any other type of drawing and permutation may be used for building the modified S-boxes.

Further, building the S-boxes based on the three operations described may be carried out with any other type of shape, and in particular in another shape than an S-box special for the DES used as an example in this description.

Although specific embodiments of the invention have been described and illustrated, the invention is not to be limited to the specific forms or arrangements of parts so descried and illustrated. The invention is limited only by the claims.

The invention claimed is:

1. A method for operating an electronic system to secure a multi-round cryptographic calculation procedure wherein each round is performed using a round-operation that uses a secret key and an encryption function f or a replacement thereof, the method comprising operating the electronic system to: determine a sequence of round-operations selected from a set of round-operations including round-operations performing a function p selected from the set of functions f, a masking operation followed by f, and f followed by an unmasking operation, and defined by whether each input of the round-operation has an input-type of masked or unmasked, respectively, and at least one output having an output-type of masked or unmasked depending on the input-types for the inputs, respectively, and the function p; wherein the sequence of round-operations is selected such that for two sequential rounds i and i+1, each output from round i serves as an input to round i+1 and the output-type for each output from round i matches the input-type for the corresponding input to round i+1; and execute the determined sequence of rounds.

2. The method of operating an electronic system to secure a multi-round cryptographic calculation procedure of claim 1 wherein the round-operations have a left input, a right input, a left output and a right output and are selected from the set including round-operations that:

A. accept unmasked inputs and produce unmasked output using the function f to produce the left output;

B. accepts unmasked inputs and produces an unmasked left output and a masked right output;

C. accepts an umasked left input, a masked right input and produces a masked left output, and an unmasked right output;

D. accepts a masked left input, an unmasked right input, and produces an unmasked left output, and a masked right output;

E. accepts a masked left input, an unmasked right input, and produces unmasked outputs.

3. The method for operating an electronic system to secure a multi-round cryptographic calculation procedure of claim 1 or 2 wherein at least one masking operation is a non-public masking operation.

4. The method for operating an electronic system to secure a multi-round cryptographic calculation procedure of claim 1 or 2 wherein the sequence of round-operations comprises a first and a second subsequence such and wherein the mask applied in the masking operations in the first subsequence is different from the mask applied in the second subsequence.

5. The method for operating an electronic system to secure a multi-round cryptographic calculation procedure of claim 4 wherein the end of the first subsequence is defined by a round-operation having all unmasked outputs.

6. An electronic system comprising:
storage device storing a cryptographic calculation procedure that uses a secret key executable by a processor,
a processor programmed to:
determine a sequence of round-operations selected from a set of round-operations including round-operations performing a function p selected from the set of functions f, a masking operation followed by f, and f followed by an unmasking operation, and defined by whether each input of the round-operation has an input-type of masked or unmasked, respectively, and at least one output having an output-type of masked or unmasked depending on the input-types for the inputs, respectively, and the function p;
wherein the sequence of round-operations is selected such that for two sequential rounds i and i+1, each output from round i serves as an input to round i+1 and the output-type for each output from round i matches the input-type for the corresponding input to round i+1; and
execute the determined sequence of rounds.

7. The electronic system of claim 6 wherein the round-operations have a left input, a right input, a left output and a right output and are selected from the set including round-operations that:
A. accept unmasked inputs and produce unmasked output using the function f to produce the left output;
B. accepts unmasked inputs and produces an unmasked left output and a masked right output;
C. accepts an umasked left input, a masked right input and produces a masked left output, and an unmasked right output;
D. accepts a masked left input, an unmasked right input, and produces an unmasked left output, and a masked right output;
E. accepts a masked left input, an unmasked right input, and produces unmasked outputs.

8. The electronic system of claim 6 or 7 wherein at least one masking operation is a non-public masking operation.

9. The electronic system of claim 6 or 7 wherein the sequence of round-operations comprises a first and a second subsequence such and wherein the mask applied in the masking operations in the first subsequence is different from the mask applied in the second subsequence.

10. The electronic system of claim 9 wherein the end of the first subsequence is defined by a round-operation having all unmasked outputs.

11. A non-transitory computer storage media operable to store instructions for instructing a processor of an electronic system to perform certain operations, the storage media comprising:
instructions to direct the processor to:
determine a sequence of round-operations selected from a set of round-operations including round-operations performing a function p selected from the set of functions f, a masking operation followed by f, and f followed by an unmasking operation, and defined by whether each input of the round-operation has an input-type of masked or unmasked, respectively, and at least one output having an output-type of masked or unmasked depending on the input-types for the inputs, respectively, and the function p;
wherein the sequence of round-operations is selected such that for two sequential rounds i and i+1, each output from round i serves as an input to round i+1 and the output-type for each output from round i matches the input-type for the corresponding input to round i+1; and
execute the determined sequence of rounds.

12. The non-transitory computer storage media of claim 11 wherein the round-operations have a left input, a right input, a left output and a right output and are selected from the set including round-operations that:
A. accept unmasked inputs and produce unmasked output using the function f to produce the left output;
B. accepts unmasked inputs and produces an unmasked left output and a masked right output;
C. accepts an umasked left input, a masked right input and produces a masked left output, and an unmasked right output;
D. accepts a masked left input, an unmasked right input, and produces an unmasked left output, and a masked right output;
E. accepts a masked left input, an unmasked right input, and produces unmasked outputs.

13. The non-transitory computer storage media of claim 11 or 12 wherein at least one masking operation is a non-public masking operation.

14. The non-transitory computer storage media of claim 11 or 12 wherein the sequence of round-operations comprises a first and a second subsequence such and wherein the mask applied in the masking operations in the first subsequence is different from the mask applied in the second subsequence.

15. The non-transitory computer storage media of claim 14 wherein the end of the first subsequence is defined by a round-operation having all unmasked outputs.

* * * * *